United States Patent [19]

Taft et al.

[11] Patent Number: 4,809,730

[45] Date of Patent: Mar. 7, 1989

[54] ELECTROFLUID CONVERTERS

[75] Inventors: Charles K. Taft, Durham; Timothy S. Burke, Newmarket, both of N.H.

[73] Assignee: University of New Hampshire, Durham, N.H.

[21] Appl. No.: 474,536

[22] Filed: Mar. 10, 1983

[51] Int. Cl.⁴ .......................................... G05D 16/00
[52] U.S. Cl. ..................................... 137/82; 137/831; 251/129.06
[58] Field of Search .................. 137/82, 83, 831, 832; 251/129, 129.06

[56] References Cited

U.S. PATENT DOCUMENTS 3,275,238  9/1966  Nilles ............................... 137/82 X
3,451,412  6/1969  Render .............................. 137/831

Primary Examiner—Alan Cohan
Attorney, Agent, or Firm—Robert Shaw

[57] ABSTRACT

A converter or valve to modulate fluid flow, that includes a fluid channel to receive the fluid which is delivered to an output. An electrically-energized bender is disposed in close proximity to the output of the fluid channel; the bender is an elongate strip secured at one end and free to move at the other end toward or away from the output to interact with fluid flow from the output. An electric energy source is connected to bias the bender electrically to provide a small, controllable separation between the free end of the bender and the output of the fluid channel to provide an orifice for fluid flow, pumping action, as the bender moves relative to the output, upon a fluid film, separate from the fluid flow, serving either to compress or to expand the fluid film to achieve damping of the bender. The bender, in a modification, is shown in the form of a disc.

12 Claims, 3 Drawing Sheets

ELECTROFLUID CONVERTERS

The present invention relates to apparatus operable interchangeably to convert fluid pressure and electric signals.

Attention is called to a thesis entitled "A Proportional Piezoelectric Electro-Pneumatic Servovalve Design" (Herrick) and to a paper entitled "A Low Power Electro-Pneumatic Servovalve Design" (Taft and Burke, the present inventors), the latter being drawn upon heavily in this specification.

In most modern control systems a microprocessor is used as the controller. The microprocessor offers the benefits of rapid and continuous monitoring and processing of data and it provides as well great flexibility in control strategy implementation. For a microprocessor to be used in fluid systems of the type to which this invention is directed, there must be a compatible interface to couple the microprocessor to the fluid system. A converter serving as such interface should be reliable and compatible with the digital to analog (D/A) output of the microprocessor; it is an object of the present invention to provide such a converter, an electropneumatic converter which, because of its high linearity and bandwidth and low power consumption, serves as a compatible and reliable interface between the microprocessor and pneumatic control elements.

Another object is to provide a converter whose output can be electrical or can be mechanical.

Still another object is to provide a converter whose output signals, whether those signals be electrical or mechanical, are proportional (i.e., substantially linear) in the range of operation.

A further object is to provide a proportional device with low input power and high speed characteristics.

A still further object is to provide a device which produces an output pressure proportional to an electrical signal with very low electrical power input.

These and still further objects are addressed hereinafter.

The foregoing objects are achieved, generally, in a system or converter comprising a plate or the like having a fluid-flow channel therein with an opening or port at one face thereof. A bender (or transducer) in the form of a sandwich of two piezoelectric strips or the like is secured, at one end thereof, to the plate, the free end of the strip being disposed over and in close proximity to the opening or port to form a flapper-nozzle, movement of the strip toward and away from the opening or port serving to affect fluid flow through the nozzle and, conversely, fluid flow through the nozzle serving to effect bending of the bender away from and toward the opening or port. The bender, as later discussed in some detail, may be a disc secured at its periphery. Electric means is connected to the bender to apply a bias voltage thereto, which bias voltage is controlled to effect a small controllable separation between the bender and the nozzle opening or port to provide an orifice for fluid passage. Pumping action of a fluid film between the bender and the plate is achieved whenever the bender moves relative to the plate to achieve damping of bender movement. A most important aspect of the invention is a system or converter consisting of two benders in a push-pull configuration in which one bender, when actuated by an electric potential, decreases fluid flow through one flapper-nozzle, while the other bender is actuated to increase fluid flow through another flapper-nozzle.

The invention is hereinafter described with reference to the accompanying drawing in which.

Figure 1:
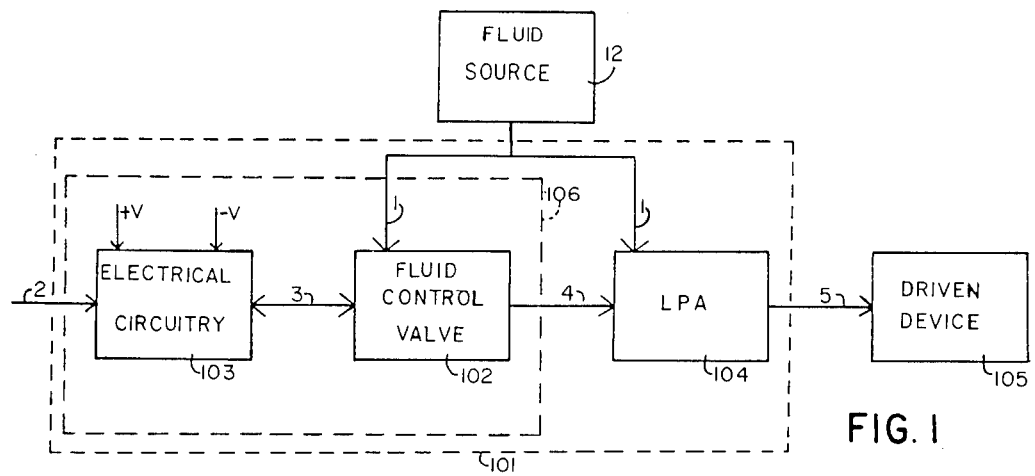
FIG. 1 is a diagrammatic representation of a system embodying the present inventive concepts, that includes a fluid-control valve and associated electrical circuitry.

The system shown at 101 in FIG. 1 employs an electrofluid converter 106 (that includes a fluid valve 102 and electrical circuitry 103) and a laminar proportional amplifier (LPA) 104 to drive a driven device 105. The converter 106 as a functioning unit, as indicated, includes both the valve 102 and the electrical circuitry 103, as shown in greater detail in FIG. 2. The apparatus in FIG. 1 further includes an air supply input at 1 from a fluid source 12 to both the fluid-control valve 102 and the LPA 104. The lines labeled 2 and 3 represent electrical conductors, whereas lines 1, 4 and 5 are fluid (e.g., air) lines. The conductor 3 is shown with arrows pointing in either direction to indicate that electrical signals can travel to the electrical circuitry 103 from the block 102 as well as vice versa. As noted hereinafter, in operation as a valve, an electrical signal is applied to a piezoelectric bender or transducer which controls fluid flow in a fashion proportional to the magnitude of the applied voltage and that is the mode of operation discussed in the first part of this explanation.

Figure 2:
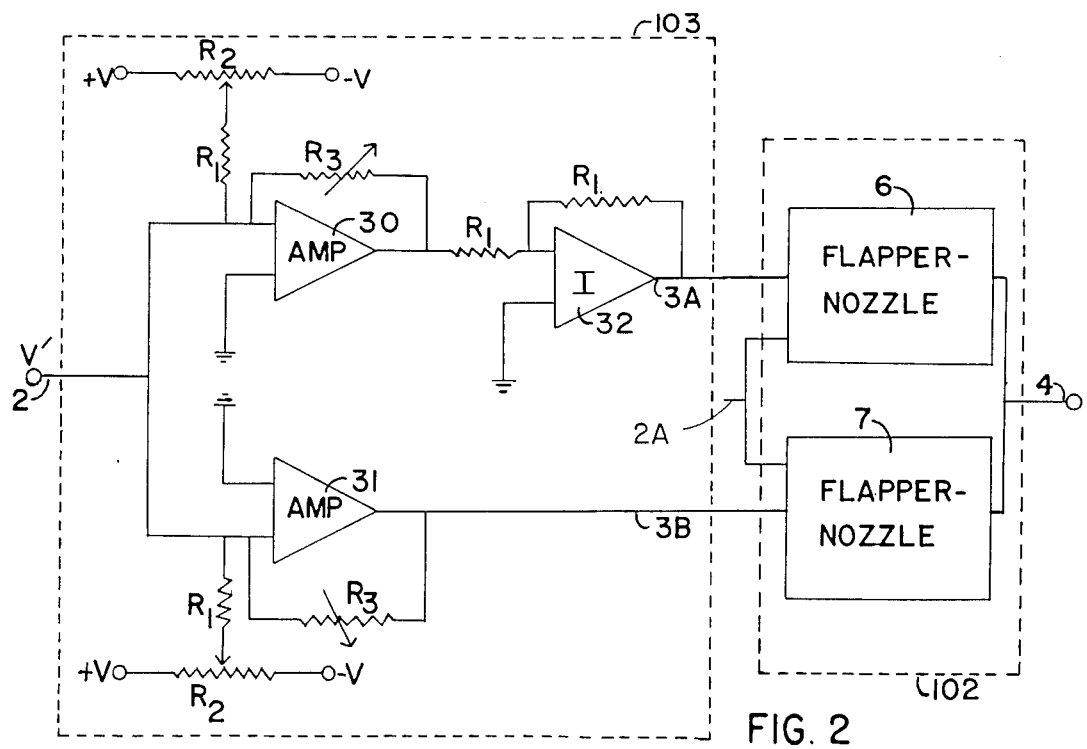
FIG. 2 is a diagrammatic view showing the electrical control circuitry of FIG. 1 in greater detail and the two fluidcontrol valves as two fluid-control flapper-nozzles.

The fluid valve 102 is shown in FIG. 2 including two flapper-nozzles 6 and 7 which are now explained with reference to FIGS. 3, 4, 5 and 6. The flapper-nozzles 6 and 7 consist of benders 8 and 9, respectively, that control fluid flow into the chambers shown at 10 and 11, respectively, in FIG. 3 from fluid channels 15 and 16, respectively. The fluid employed in the systems discussed herein is usually air and that fluid is emphasized here, but other fluids, including oil, may be employed.

Figure 3:
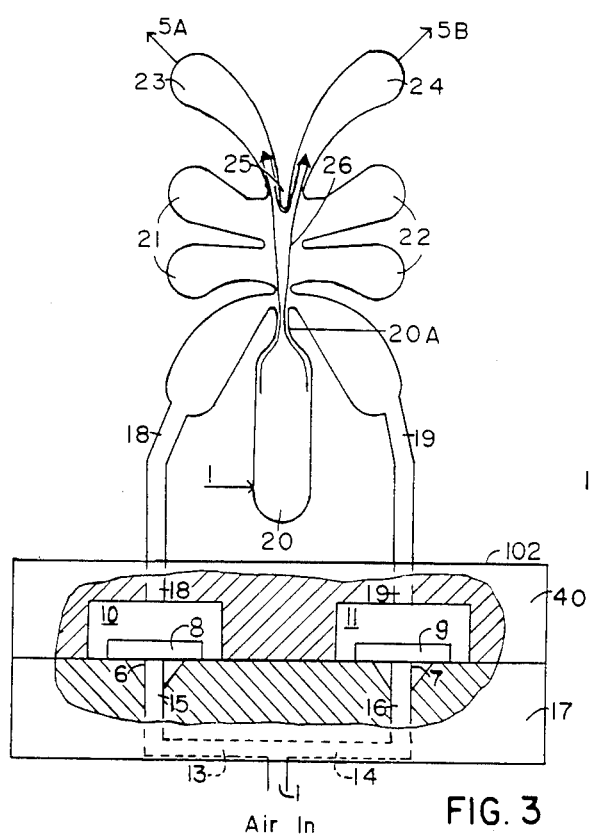
FIG. 3 is an elevation view, schematic in form and partly cutaway, showing the two fluid-control flapper-nozzles of FIG. 2 and related fluid mechanisms.
Figure 4:
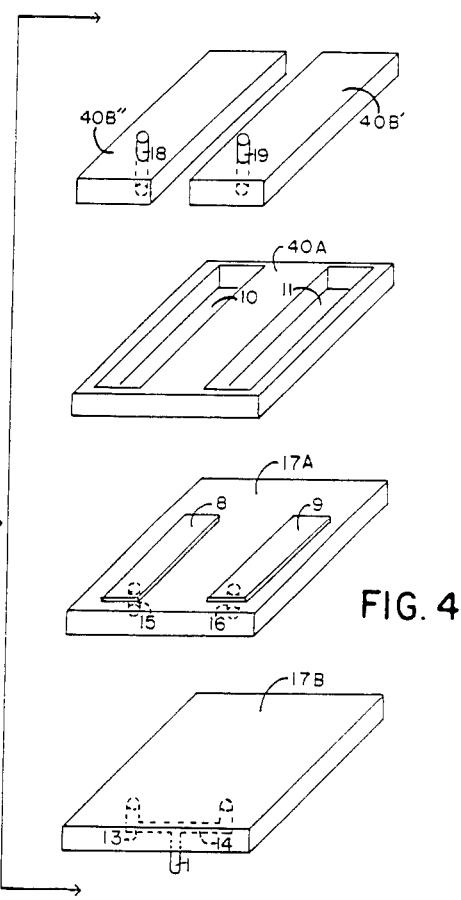
FIG. 4 is an isometric, exploded view of the two fluid-control flapper-nozzles of FIG. 3 and related mechanisms.

Air passes into the lower port marked 1 in FIG. 3, thereafter flowing in a fluid line 13 or a fluid line 14 (formed in a plate 17B in FIG. 4; the plates 17A and 17B in FIG. 4 constitute the plate marked 17 in FIG. 3); the relative flows in 13 and 14 depend upon which of the nozzles 6 and 7 is open wider. The term "open" herein is used to denote a condition in which air can flow upward from a channel 15 or 16, as the case may be, through the regions between the benders 8 and 9 and the plate 17A (in which the fluid channels 15 and 16 are formed), which regions serve as controlled orifices to emit fluid into the chambers 10 and 11 in a plate 40 (which in actual apparatus are formed in a separate plate 40A, as shown in FIG. 4); the plate 40A plus plates 40B' and 40B" constitute the plate 40 in FIG. 3), as explained below in greater detail. The plates 40B' and 40B" must be electrically insulated from one another (plate 40A is an insulator), as do also the top surfaces of the benders 8 and 9 that are connected to the plates 40B' and 40B" by the conductors 3A and 3B, respectively, in FIG. 5.

Figure 5:
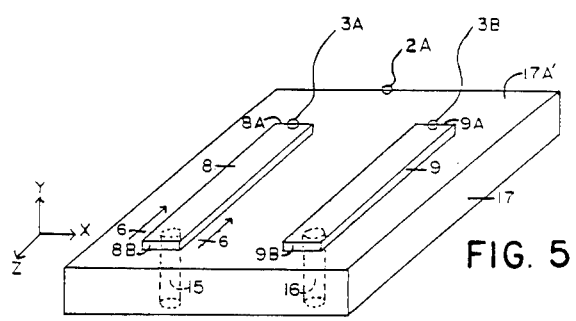
FIG. 5 is an isometric, enlarged view showing in greater detail the two fluid-control flapper-nozzles of FIGS. 3 and 4.
Figure 6:
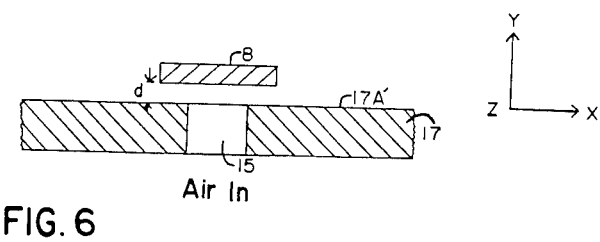
FIG. 6 is an enlarged partial view taken on the line 6—6 in FIG. 5 looking in the direction of the arrows.

Each of the benders 8 and 9, as shown in FIG. 5, is in the form of an elongate strip and each strip is piezoelectric. The benders 8 and 9 are secured to the upper face marked 17A' of the plate 17 (FIG. 5) at ends 8A and 9A thereof and are free at ends 8B and 9B to move toward and away from the associated nozzle opening (i.e., in the y-direction in FIG. 6) respectively reducing and increasing air flow upward through the orifice formed between each output or opening of the fluid channels 15 and 16 and the benders 8 and 9. Movement of the benders 8 and 9 is achieved by connecting energizing voltages of opposite polarity across the two benders 8 and 9, using the plate 17 and the conductors 3A and 3B. The conductor 2A is an external connection necessary to complete the circuit between each bender and the electrical control circuitry 103 in FIG. 3. According to the present teachings the voltage applied to each bender includes a low bias voltage (typically about +6 volts) which raises the bender to provide a gap d (~0.001 inch) in FIG. 6 between the face 17A' of the plate and the bender. The bender (e.g., 8) can then move up (+y) or down (−y) in FIG. 6 respectively to cause an increase in flow and a decrease in flow through the orifice between the bender and the plate. According to the present teachings, the bender 8 is actuated to move upward in FIG. 5 when the bender 9 is actuated to move downward. The slight separation d of each bender from the plate allows the flow through the nozzles with zero input control signal to each bender to be adjusted by the resistors $R_2$ to balance them and also effects pumping action of fluid disposed between each bender and the plate whenever the bender moves relative to the plate to achieve damping of each bender.

As is indicated above, each bender is disposed within a cavity (i.e., the cavities 10 and 11) having an exit port (i.e., the ports labeled 18 and 19 formed in plates 40B' and 40B" in FIG. 4 and which together form the output 4 in FIGS. 1 and 2) so that the bender acts as a variable restrictor with respect to fluid movement into the associated cavity for a fixed pressure at the supply port 1. The ports 18 and 19 serve also as control ports of the LPA (or fluidic amplifier): they are fixed in size; hence, fluid flow into the ports (and thus into the LPA) changes as the restriction changes. In accordance with the present teachings, the push-pull activation of the bender 8 up and bender 9 down effects an increase in fluid flow into the cavity 10 and a decrease flow into the cavity 11, thereby providing at the exit ports of the particular bender pair a differential pressure signal which is provided as input to the LPA (see the further explanation below).

The operation of the fluid valve 102 involves two energy conversions. An electrical signal is first converted to mechanical motion using a piezoelectric bender. The resulting mechanical motion is converted to a pressure signal using the bender as a flapper-nozzle valve. The piezoelectric bender is a beam mounted in a cantilever fashion. The bender consists of two sheets of lead zirconate titanate bonded onto a central brass shim. The two sheets are coated with nickel to achieve better distribution of electrical charges over the surface. When a voltage is applied to the bender, one of the two sheets of piezoelectric material is placed in tension while the other is in compression; thus the bender will deflect in a manner similar to a bimetallic strip. The amount of deflection is on the order of thousandths of an inch and the corresponding amount of output force that the beam produces is small. To limit the static and dynamic flow forces on the beam, small nozzle diameters of 0.030" (i.e., the cross-dimensions of the openings from the channels 15 and 16 in FIG. 5) and low supply pressures (e.g., 0.0447 psi) must be used in the nozzles 6 and 7 in FIG. 2. The resulting pressure signals downstream from the nozzles are also small; so some mechanism of pneumatic amplification must be used.

Amplification is accomplished by the laminar proportional amplifier 104 in FIG. 1 which amplifies the pressure signal to some workable level. The LPA is a mechanism known to workers in this art. It is a no-moving part pneumatic amplifier with high gain, high bandwidth and low noise characteristics. Several LPAs, usually, are cascaded and the block 104 is considered to have one or more such units. The final pressure signal at 5 can be used to operate a pneumatic controller at 105 in FIG. 1 or a second stage pneumatic power valve at 103. Although the LPA is a known device, a short explanation of its operation is now made with reference to FIG. 3.

The alternate fluid pressure signals that appear at 18 and 19 are used as a differential pressure input to a first LPA such as the LPA shown diagrammatically and in detail in FIG. 3. A supply pressure is maintained in a chamber 20 of the LPA in FIG. 3. This supply pressure causes a laminar flow jet labeled 26 to flow through the channel labeled 20A. This laminar flow jet passes through the rest of the device and is split by a wedge 25. With no differential input, equal amounts of flow are collected in two output ports 23 and 24. If the pressure at the input port 19 is greater than the pressure at the other input port 18, the jet emitting from the channel 20A is deflected and more flow is collected in the output port 23 (output 9A) than in the output port 24 (output 9B). As a result of the larger fluid momentum in the port 23, a pressure larger than the pressure in the port 24 is developed in the port 23. Only a small input pressure differential at 18 and 19 is required to deflect the jet 26 and this produces a larger output pressure difference, thus resulting in a pressure gain. The output pressure difference at 23 or 24, as the case may be, can be as much as 0.7 of the supply pressure applied at 20. Chambers 21 and 22 are vents to the atmosphere.

Another LPA could be placed in series with the first, using the outputs of the first LPA as inputs to the second. This would further amplify the pressure differential between the ports 18 and 19. In the present device employed by the inventors, four amplifiers are cascaded in series to produce a gain of 1650; it is considered, for present purposes and as above noted, that the LPA 104 in FIG. 1 includes one or more such amplifiers.

One form of electrical circuitry to achieve the present purposes is shown within the block 103 in FIG. 2, wherein the voltages at V are typically +15 volts and −15 volts dc and the voltage at V' is a dc signal with a maximum swing of ±6 volts. The circuit includes fixed resistors $R_1$, and potentiometers $R_2$ and $R_3$. The circuit also includes amplifiers 30 and 31 whose outputs apply voltages to the benders 8 and 9 (see inputs 3A and 3B, respectively, in FIG. 5), the voltage applied to the bender 8 (within the block 6 in FIG. 2) being connected through an inverter 32 to give the push-pull operation above discussed.

The information in this paragraph can be augmented by reference to the Taft et al. paper. The benders used in actual apparatus were strips that measured $4.3 \times 10^{-2}$ m. long, $1.27 \times 10^{-2}$ m. wide and $5.0 \times 10^{-4}$ m. thick. The valve system was tested both statically and dynamically; it has an overall sensitivity of 0.04 psi/volt and is linear around an operating voltage of $\pm 6$ volts with input pressure at 1 in FIG. 3 of 0.0447 psi; pressures in the chambers 10 and 11 depend on the position of respective bender and were not measured.

The system in its present configuration has a system bandwidth of 500 Hz. The electrical input power requirements to the valve 102 are very small due to the high input impedance ($>20M\Omega$) of the piezoelectric benders. The final output pressure signal has an amplitude of $\pm 0.25$ psi.

A most important aspect of the present invention is increased damping of the benders (or beams) 8 and 9 due to a film of air between each bender and the plate, which is squeezed or expanded as the bender moves. This squeeze-film damping is enhanced by mounting the bender nearly flush with the surface of the plate 17 and serves, as is noted in some detail in the Taft et al. paper, greatly to reduce bender oscillations that would adversely affect the system 101 in FIG. 1.

Further, the converter 106 is a proportional device (i.e., linear) with low power and high speed. Each bender deflects an amount proportional to the magnitude of the voltage applied thereto and the downstream pressure (e.g., at 18 and 19) is proportional to the pressure in the chambers 10 or 11. While the system described above provides an output pressure difference proportional to the input voltage, it can be employed in a true modulation sense in that the input air at 1 can be subjected to small modulations in the context of audible sound, for example, which modulations are converted by the bender to electrical signals or a flowmeter can be fabricated which will measure rate of change of such a flow. Such a flowmeter would be useful to measure pulsations in flow.

Figure 9:
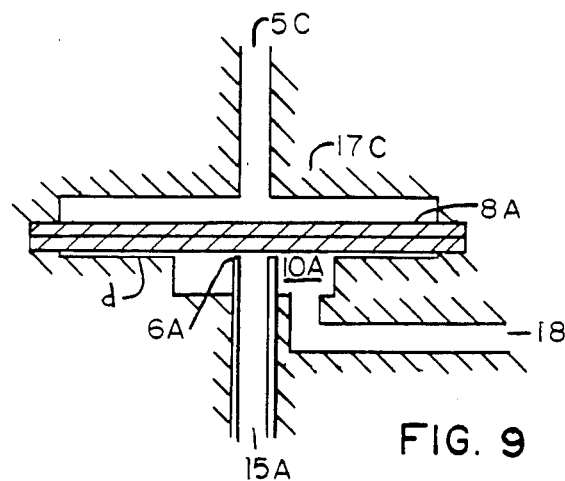
FIG. 9 is a representation taken on the line 9—9 in FIG. 8, looking in the direction of the arrows, showing diagrammatically the nozzle of FIG. 8 and immediately surrounding mechanical parts.
Figure 8:
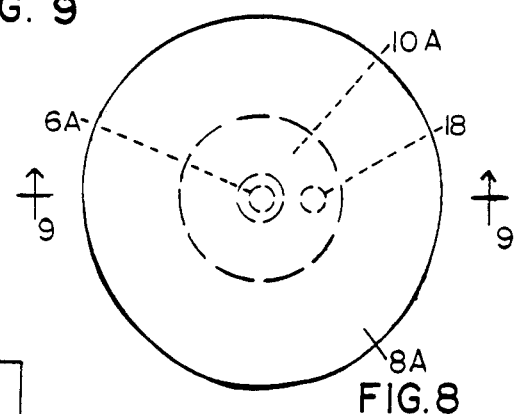
FIG. 8 is a plan view of a nozzle structure that differs structurally from the two flapper-nozzles of FIG. 5.
Figure 7:
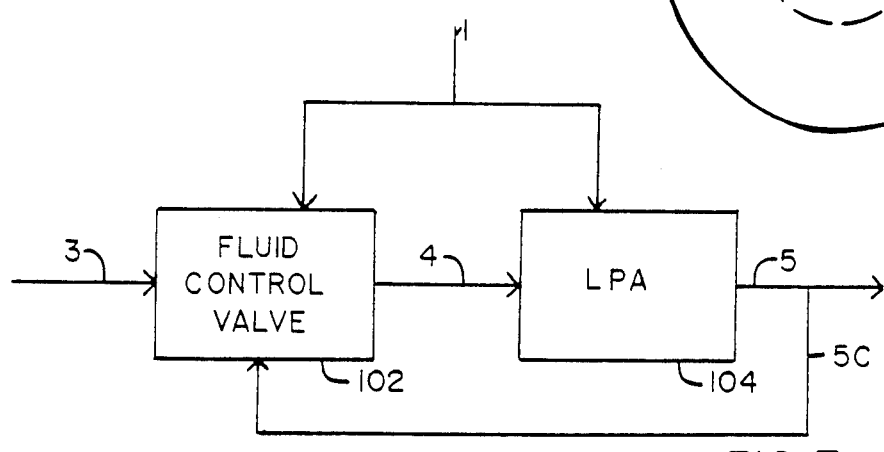
FIG. 7 is a diagrammatic representation of a modification of a portion of the system of FIG. 1.

In the foregoing explanation, the benders discussed are piezoelectric strips. The valve shown in FIGS. 8 and 9 employs a bender 8A in the form of a disc (it is intended that the term "disc" herein denotes a thin wafer whose cross-dimensions are usually circular but may take some other closed-loop shape). The disc 8A is secured at its periphery and is free to move at its center toward and away from the output of a fluid channel (which is again labeled 15 in FIG. 8) to interact with fluid flow from the output of the channel 15 and into a chamber 10A. The output of the chamber 10A is again marked 18. A small spacing labeled d in FIG. 9 between the bender 8A and a flat surface formed in the plate marked 17C (in which the chamber 10A is formed), serves the damping function above discussed. The valve of FIGS. 8 and 9 may have a feedback input at 5C in FIG. 9 from the LPA 104 in FIG. 7 to further assist in damping and other effects on the bender 8A.

Modifications of the invention herein disclosed will occur to persons skilled in the art and all such modifications are deemed to be within the scope of the invention as defined by the appended claims.

What is claimed is:

1. A converter for modulating fluid flow, that comprises:
   a plurality of piezoelectric benders, each in the form of an elongate strip;
   an equal plurality of fluid-flow channels, one fluid-flow channel being associated with each bender of the plurality of benders and being formed in a flat plate with the channel output opening at the face of the plate;
   each bender being secured to the face of the plate at one end and being free to move toward and away from the associated channel output opening at the other end thereof to form a flapper-nozzle which serves to control fluid flow from the output opening; and
   electric means connected to each of the benders to apply a bias voltage thereto to alter the zero-signal position of each said flapper-nozzle and to balance the zero-signal position of each said flapper-nozzle, said electric means being further connected to apply an actuation voltage to the benders to effect deflection thereof away from said zero-signal position, a bender, upon application of said actuation voltage, being deflected toward the associated output opening to cause a decrease in fluid flow from the associated output opening while another bender is deflected away from the associated output opening to cause an increase in fluid flow from the associated output opening.

2. A converter as claimed in claim 1 comprising two benders, each bender, when electrically biased, being only slightly separated from the plate, so that subsequent bender motion will effect pumping action of fluid disposed between each bender and the plate whenever the bender moves relative to the plate to achieve damping of each bender.

3. A converter as claimed in claim 2 wherein each bender is disposed within a cavity having an exit port so that the bender acts as a variable restrictor with respect to fluid movement into the cavity from said output opening for a given pressure difference between the exit port of the cavity and the associated nozzle input.

4. A system comprising a converter as defined by claim 3, that further includes amplifier means to receive as input thereto the two outputs from the converter exit ports and operable to amplify any differences between the fluid pressures of the two outputs.

5. A converter as claimed in claim 2 comprising two fluid outputs, one associated with each bender, such that, for a given fixed input of fluid to the flapper-nozzles, the output pressure of one flapper-nozzle will fall for a given applied voltage and the output of the other flapper-nozzle will rise.

6. A converter as claimed in claim 1 wherein said plurality of benders and associated openings comprise a plurality of bender pairs and associated opening pairs, each bender having an exit port therefrom, electric means to apply a voltage to each bender such that one bender of each pair, upon application of the voltage, moves toward the plate while the other bender of the same pair moves away from the plate to provide at the exit ports of the particular pair a differential pressure signal.

7. A system that includes a converter as defined by claim 6 that further includes amplifier means to receive the differential pressure signal and operable to amplify the same.

8. A converter that comprises:
- a plate having a fluid-flow channel through the thickness dimension thereof and having an output port at the plate surface;
- a piezoelectric bender in the form of an elongate strip, one end of the bender being secured to the plate and the other, free end, being disposed over the output port of the fluid-flow channel to form a flapper-nozzle so that fluid flow through the nozzle effects bending of the bender away from and toward the output port, fluid-flow away from the output port effecting bending of the bender away from the output port; and
- electric means connected to the bender to apply a bias voltage thereto, which bias voltage is controlled to effect a small separation between the bender and the channel output port to provide an orifice for said fluid flow, a fluid film, separate from said fluid flow, being compressed or expanded whenever the bender moves relative to the plate to achieve damping of bender movement, in which said fluid flow is modulated and in which the modulations are converted by the bender to electrical signals.

9. A dynamic flowmeter comprising the converter of claim 8 and further including means connected to receive the bender voltage produced by bender deflection and to sense changes therein, which changes occur because of a piezoelectric-generated voltage occasioned by bending of the bender due to changes in the flow of the fluid through the orifice.

10. For use in a converter that further includes electric means, a fluid valve that comprises two electrically energized benders; two fluid-flow channels, one channel being associated with each bender, each channel having an output opening; each said bender at one end thereof being secured in fixed spaced relationship to the associated output opening, the free end of each bender being disposed to cover the associated output opening to interact with fluid flow emitting from the associated output opening.

11. A converter that includes the fluid valve of claim 10 and that further includes electric means connected to energize the benders to bias the respective bender to effect a small separation between each bender and the associated opening to provide an orifice for fluid passage which achieves pumping action whenever the bender moves relative to the plate to achieve damping of bender movement.

12. A converter for modulating fluid-flow, that comprises:
- a. a plurality of piezoelectric benders, each bender in the form of an elongate strip;
- b. a plate having a plurality of chambers, one chamber being associated with each bender of the plurality of benders, said chamber comprising:
  - i. a cavity within which said associated bender is disposed, and where said fluid is modulated,
  - ii. a channel (or input port) supplying a nonmodulated fluid to said cavity with said associated bender, and
  - iii. an exit (or output port) extending from said cavity with said associated bender to conduct said modulated fluid away from said cavity and said associated bender;
- c. means for connecting one end of each bender strip to the surface of said cavity in cantilever fashion, the other end of said bender strip being free to deflect toward and away from said channel associated with said cavity, in order to modulate fluid-flow from said channel; and
- d. electric means connected to said bender to apply a bias voltage to each bender, said electric means being further connected to apply an actuation voltage to each bender to effect deflection thereof, a bender upon application of said actuation voltage, being deflected toward the associated opening to effect a decrease in fluid flow through the opening while another bender is deflected away from the associated opening to permit an increase in flow of fluid through the opening.

* * * * *